(12) United States Patent
Lin et al.

(10) Patent No.: US 9,980,279 B2
(45) Date of Patent: May 22, 2018

(54) DYNAMIC TIME DIVISION DUPLEX MECHANISM FOR SMALL CELL NETWORK

(71) Applicant: Taiwan Semiconductor Manufacturing Company, Ltd., Hsinchu (TW)

(72) Inventors: Hsuan-Li Lin, Hsinchu (TW); Ching-Yao Huang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days. days.

(21) Appl. No.: 14/808,047

(22) Filed: Jul. 24, 2015

(65) Prior Publication Data

US 2017/0026993 A1 Jan. 26, 2017

(51) Int. Cl.
| | |
|---|---|
| *H04W 72/12* | (2009.01) |
| *H04L 5/14* | (2006.01) |
| *H04L 27/26* | (2006.01) |
| *H04L 5/00* | (2006.01) |

(52) U.S. Cl.
CPC ....... *H04W 72/1268* (2013.01); *H04L 5/0044* (2013.01); *H04L 5/1469* (2013.01); *H04L 27/2601* (2013.01); *H04W 72/1252* (2013.01)

(58) Field of Classification Search
CPC ............. H04L 5/1469; H04L 27/2601; H04W 72/1273; H04W 72/0446; H04W 72/1268; H04B 7/0413
See application file for complete search history.

(56) References Cited

U.S. PATENT DOCUMENTS

| | | | | |
|---|---|---|---|---|
| 2010/0041445 A1* | 2/2010 | Qi | ..................... | H04W 52/0251 455/574 |
| 2010/0091726 A1* | 4/2010 | Ishii | ......................... | H04L 1/18 370/329 |
| 2011/0070845 A1* | 3/2011 | Chen | ....................... | H04L 5/001 455/91 |
| 2012/0230272 A1* | 9/2012 | Kim | ...................... | H04L 1/1861 370/329 |
| 2013/0242922 A1* | 9/2013 | Suzuki | ................... | H04L 1/1607 370/329 |

(Continued)

FOREIGN PATENT DOCUMENTS

WO WO2015/038056 * 3/2015 ............ H04W 72/12

OTHER PUBLICATIONS

David Bladsjo, Marie Hogan, and Stefano Ruffini, "Synchronization Aspects in Small Cells," IEEE Communication Magazine, 2013.

*Primary Examiner* — Mohammad S Anwar
(74) *Attorney, Agent, or Firm* — Haynes and Boone, LLP

(57) ABSTRACT

A dynamic time division duplex (TDD) mechanism for small cellular networks is disclosed. The mechanism dynamically allocates radio resource usage with commensurate increases in throughput and reductions in latency. For example, scheduling data comprising scheduling information data can be received by a device, wherein the scheduling information data comprises uplink allocation data. Then the device can switch from a first mode to a second mode as a function of the uplink allocation data, and transmission data can be transmitted in a subframe of a frame by skipping a resource allocated for the scheduling information data.

19 Claims, 12 Drawing Sheets

(56) References Cited

U.S. PATENT DOCUMENTS

| | | | |
|---|---|---|---|
| 2014/0036738 A1 | 2/2014 | Kim et al. | |
| 2014/0226607 A1* | 8/2014 | Holma | H04L 1/1812 370/329 |
| 2014/0334352 A1* | 11/2014 | Hu | H04W 16/18 370/280 |
| 2015/0237644 A1* | 8/2015 | Golitschek Edler Von Elbwart | H04W 72/12 370/329 |
| 2015/0365897 A1* | 12/2015 | Hu | H04W 52/0225 455/574 |

* cited by examiner

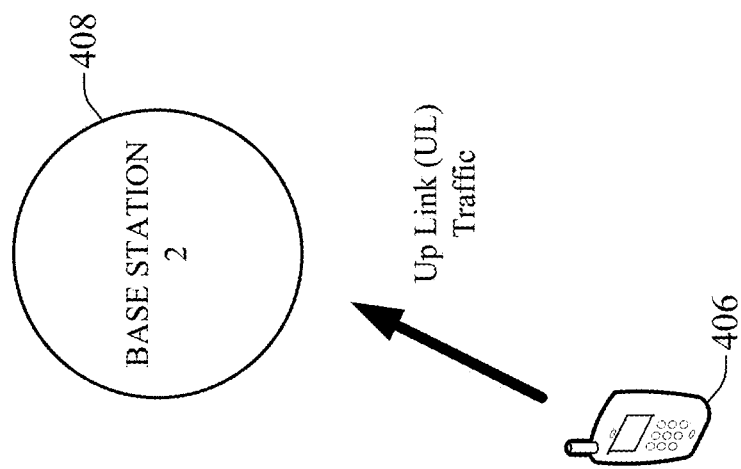
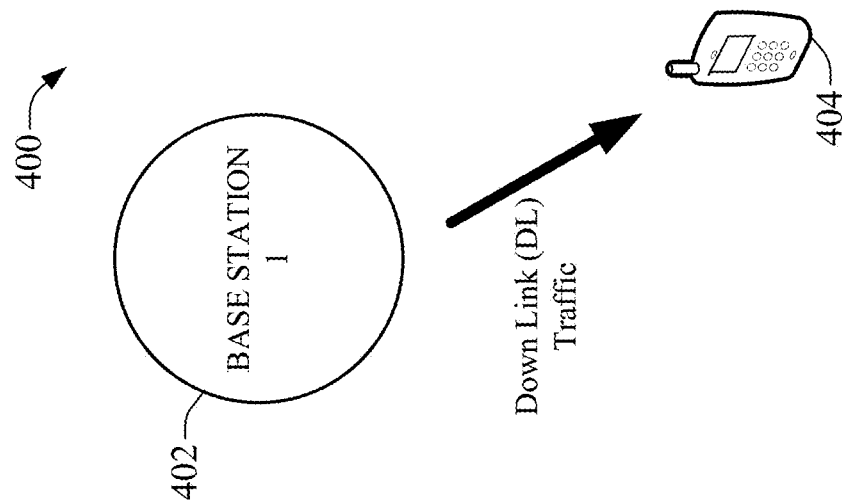
FIG. 4

DYNAMIC TIME DIVISION DUPLEX MECHANISM FOR SMALL CELL NETWORK

TECHNICAL FIELD

The disclosed subject matter relates to a dynamic time division duplex mechanism for deployment of a small cell network.

BACKGROUND

The Small Cell Enhancement (SCE) provided by Release 12 is a working item in the technical specifications for the $3^{rd}$ Generation Partnership Project (3GPP). The objective of a small cell deployment is typically to increase user throughput significantly. Nevertheless, because the relative coverage area of the cell is small there generally are only a small number of users served by such small cells which implies that the downlink/uplink (DL/UL) traffic can be more dynamic than other relatively larger cell deployments. Accordingly, should conventional DL/UL resource allocation using fixed time division duplex (TDD) or fixed frequency division duplex (FDD) schemes be applied in the context of small cell deployments, there can be multiple idle subframes. For example, UL packets can arrive without their associated UL subframes in which case, the UL packets need to wait for their associated UL subframes to arrive. Moreover, it still remains unclear how to achieve beneficial TDD under SCE.

BRIEF DESCRIPTION OF DRAWINGS

FIG. 4 provides illustration of a neighboring base station device deployment in a small cellular network in accordance with aspects of the subject disclosure.

DETAILED DESCRIPTION

Figure 1:
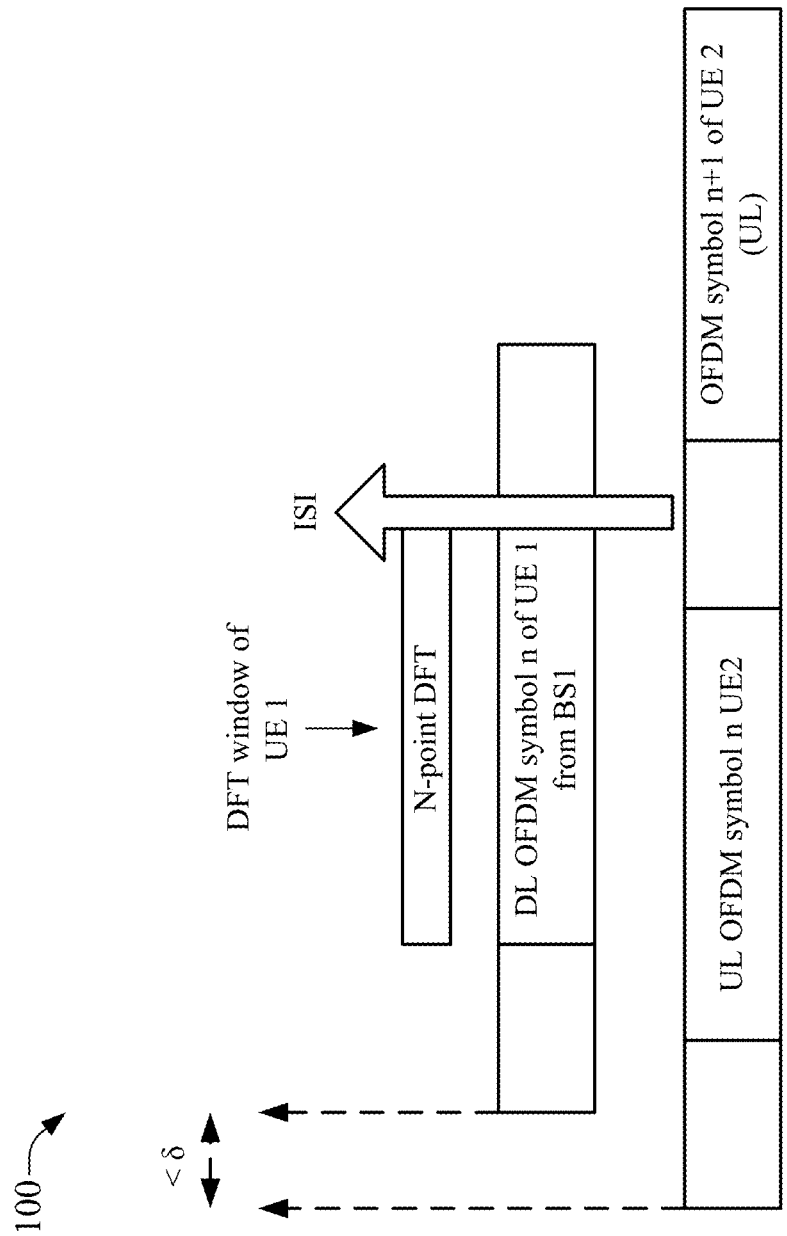
FIG. 1 is an illustration of misaligned OFDM symbols due to dynamic TDD, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In isolated cell device scenarios in a small cell device deployment, a dynamic time division duplex (TDD) mechanism can improve the performance of small cell devices. However, when there are multiple small cell devices within a confined area, several challenges can arise. First, there can be a near-far problem prevalent in many cellular systems where, because of the rapidity of changes/switches between downlink (DL) and/or uplink (UL) usage by user equipment (UE) devices associated with a deployed small cell device, neighboring cell devices might not have the same UL/DL configuration within the same resource block (RB), which can lead to significant interference problems, especially interference caused by UL traffic from a first UE device interfering with the DL traffic received by a second UE device. These problems can be mitigated by allocating UL traffic and DL traffic with different RBs. Accordingly, in accordance with an embodiment, the subject disclosure mitigates the near-far effects by using coordinated scheduling, where disparate RBs can be allocated to DL and UL traffic.

An additional challenges in the context of usage of multiple small cell devices within a confined area can entail: a significant frequency of changing between an UL and a DL mode by UE devices which commensurately involves extra cost to UE devices; limitations to dynamic range; and the inter orthogonal frequency division multiplexing (OFDM) symbol interference problem, also known as inter-block-interference (IBI), that can occur when there is a sample-level timing misalignment among UE devices (e.g., a difference of the OFDM symbol boundary perceived by disparate UE devices).

When different DL/UL configurations are applied to neighboring cells, both the near-far effect and the IBI problem can occur. In principle, coordinated scheduling can address the near-far effect when the DL and UL transmission of two nearby cell devices are scheduled in different frequency-domain resources (e.g., different RBs). However, the IBI problem generally cannot be resolved by coordinated scheduling, due to sample-level timing misalignments among UE devices. The IBI problem can be summarized as follows.

Timing misalignments typically exist in most systems and can be caused where, in practice, the time synchronization among base station devices (e.g., eNB devices) are not perfect due to limitations of the synchronization mechanism employed at the backhaul. For example, for long term evolution (LTE) TDD systems with cell radiuses smaller than or equal to 3 km, the time accuracy among the base station devices can be in the range −1.5 µs~1.5 µs, which can correspond to about 29%~32% of a cyclic prefix (CP) duration when a Normal CP is adopted in LTE systems.

Imperfect synchronization among base station devices can thus directly lead to timing misalignment among the UE devices attached to/associated with different base station devices.

Further, there can be unavoidable synchronization errors in several samples due to natural impairments such as noise, or the multi-path effect of the wireless channels. For instance, the synchronization error in LTE TDD systems can be about 1.5 μs, which can be equivalent to about 20 samples.

Moreover, if there were no synchronization errors, since UE devices can be located in different locations, due to the different propagation delays, symbol boundaries seen by different UE devices may not be the same. It should be noted that while the propagation delay in a small cell device scenario can be negligible, the subject disclosure and the described functionalities are not necessarily so limited and can have wider applicability outside the ambit of the small cell device scenario.

Thus, the timing misalignment effect among UE devices can also occur in regular cellular systems, which can have the same/similar UL/DL configurations as their neighboring cells. However, timing misalignment in these cases generally does not cause severe problems, because for DL channels, all the UE devices are in reception mode and each UE is in general attached to the base station device with the strongest received power. Thus, interference caused by the IBI is generally not as severe as that of the UL-to-DL interference in the small cell deployment scenario, where the UL UE device in a neighboring cell can be much closer than the neighbor base station device, which can in general introduce much stronger interference. Moreover, several existing interference management techniques such as Fractional Frequency Reuse (FFR), or Almost Blank Subframe (ABS) can also be employed to further suppress the inter cell interference in DL channels by adjusting per-RB transmission power (FFR) or perform time-domain resource interlacing among nearby base station devices (ABS). On the other hand, for UL channels, although UE devices can have different timing, their transmission time can be calibrated by procedures such as adjusting the timing advance (TA) to ensure that the UL signals arrive at the serving base station at almost the same time to match the OFDM symbol boundary seen by the serving base station device's OFDM receiver.

Unfortunately, when the DL and UL OFDM symbols are assigned in the same sub frame by different base station devices, severe interference problems can occur even when the DL and UL transmission are allocated in different RBs, or more specifically, in the different subcarriers. This is because the discrete Fourier transform (DFT) window, where CP is removed, at the DL UE device (receiver) can cover 2 incomplete OFDM symbols from the UL UE device (as illustrated in FIG. 1). As a result, both the two OFDM symbols lose their orthogonality after the DFT procedure, e.g., the value of the subcarrier at the DL UE device after the DFT procedure will be interfered by the linear combination of other two OFDM symbols from UL UE device.

As illustrated in FIG. 1 a first UE device (UE1) associated with a first base station device (BS1) can receive DL OFDM symbols and a second UE device (UE2) associated with a second base station device (BS2) can transmit UL OFDM symbols. As depicted in FIG. 1, it is assumed that the second UE device has a relatively earlier timing relative to the time of the first UE device, thus the UL OFDM symbol n transmitted by the second UE device will precede the DL OFDM symbol n received by the first UE device. Based on an assumption that the first UE device uses a conventional OFDM receiver, the first UE device can extract the received samples corresponding to OFDM symbol n excluding the CP portion; the first UE device extracts the last N received sample points of the OFDM symbol and performs an N-point DFT operation to the N samples to obtain the modulated signals carried in each of the subcarriers, where N is the DFT size of the OFDM system. Typically, the N received sample points are often referred as a DFT window. However, the received samples at the first UE device are also superimposed by the UL OFDM symbols transmitted by the second UE device. As noted above, the second UE device has a relatively earlier timing than the timing of the first UE device, this fact causes the DFT window of the first UE device to cover both the signals of the OFDM symbol n and the signals of the OFDM symbol n+1 transmitted from the second UE device; the DFT window of the first UE device covers the mixture of signals of the two consecutive OFDM symbols transmitted by the second UE device instead of covering the signals from the same OFDM symbol. This kind of effect is generally known as inter-symbol-interference (ISI) or inter-block-interference (IBI). The ISI (or IBI) causes the signals from the second UE device covered in the DFT window of the first UE device to have no orthogonality, and thus lead to inter-(sub)carrier-interference (ICI) after the DFT operation even when the DL transmission to the first UE device and UL transmission from the second UE device are allocated to different RB (and thus different subcarriers).

The subject disclosure provides a mechanism to support dynamic time division duplex (TDD) for small cell devices. The mechanism maximizes/optimizes utilization of network capacity and maintains UE device requirements at the same time. Further, the disclosure proposes that UL symbols can be used to delay transmission in order to mitigate problems associated with synchronization of UL/DL transitions. Additionally, the disclosure describes support for different mode usage for neighbor base station devices and UL/DL allocation within subframes. Moreover the subject disclosure provides support for a dynamic TDD frame structure, which allows different UL/DL modes at different base station devices in the same subframe; coordinates scheduling to avoid near-far problems, which is a problem that exists for all dynamic TDD methods; delay the UL transmission to avoid OFDM misalignments; and ensures that UE devices do not need to track TDD configurations, but can still be supported by dynamic TDD.

Figure 2:
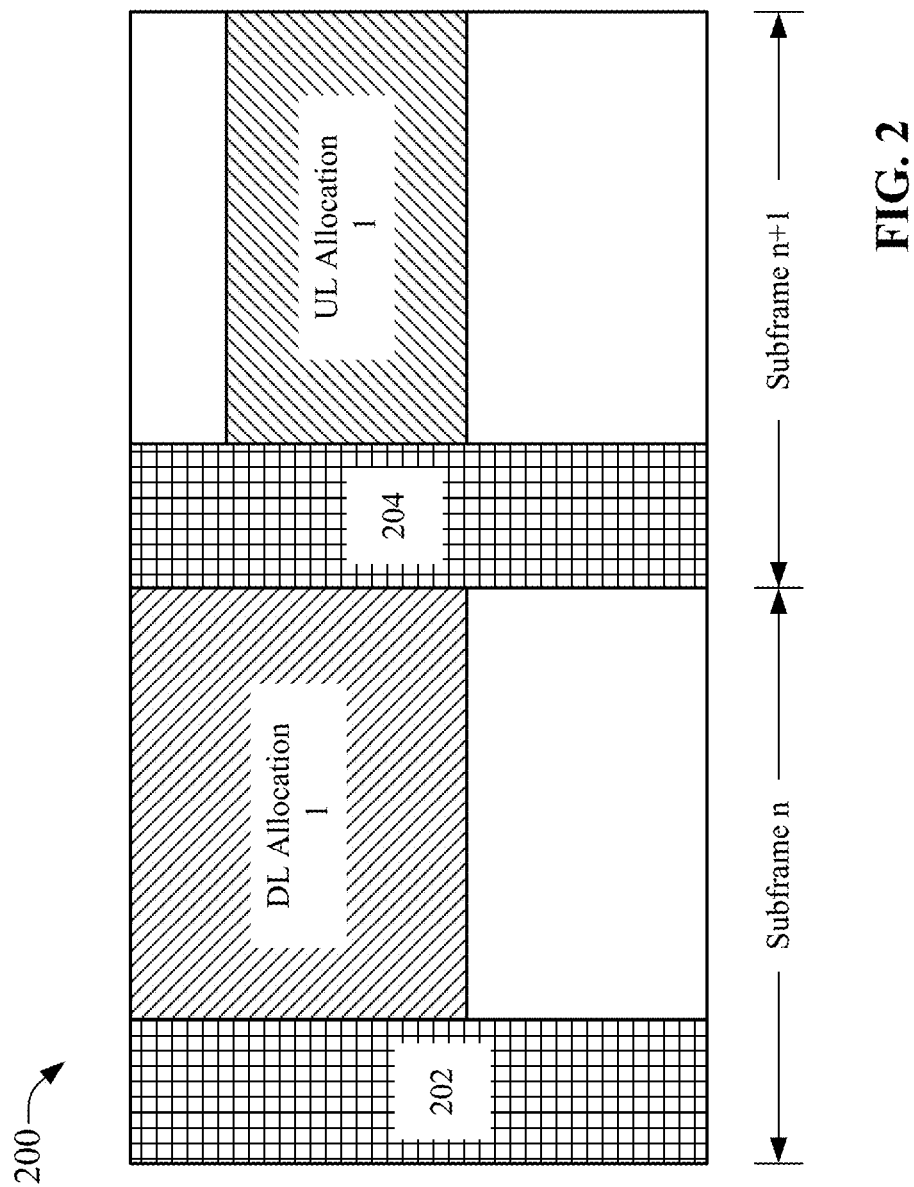
FIGS. 2-3 provide illustration of separating UL/DL resources, in accordance with aspects of the subject disclosure.
Figure 3:
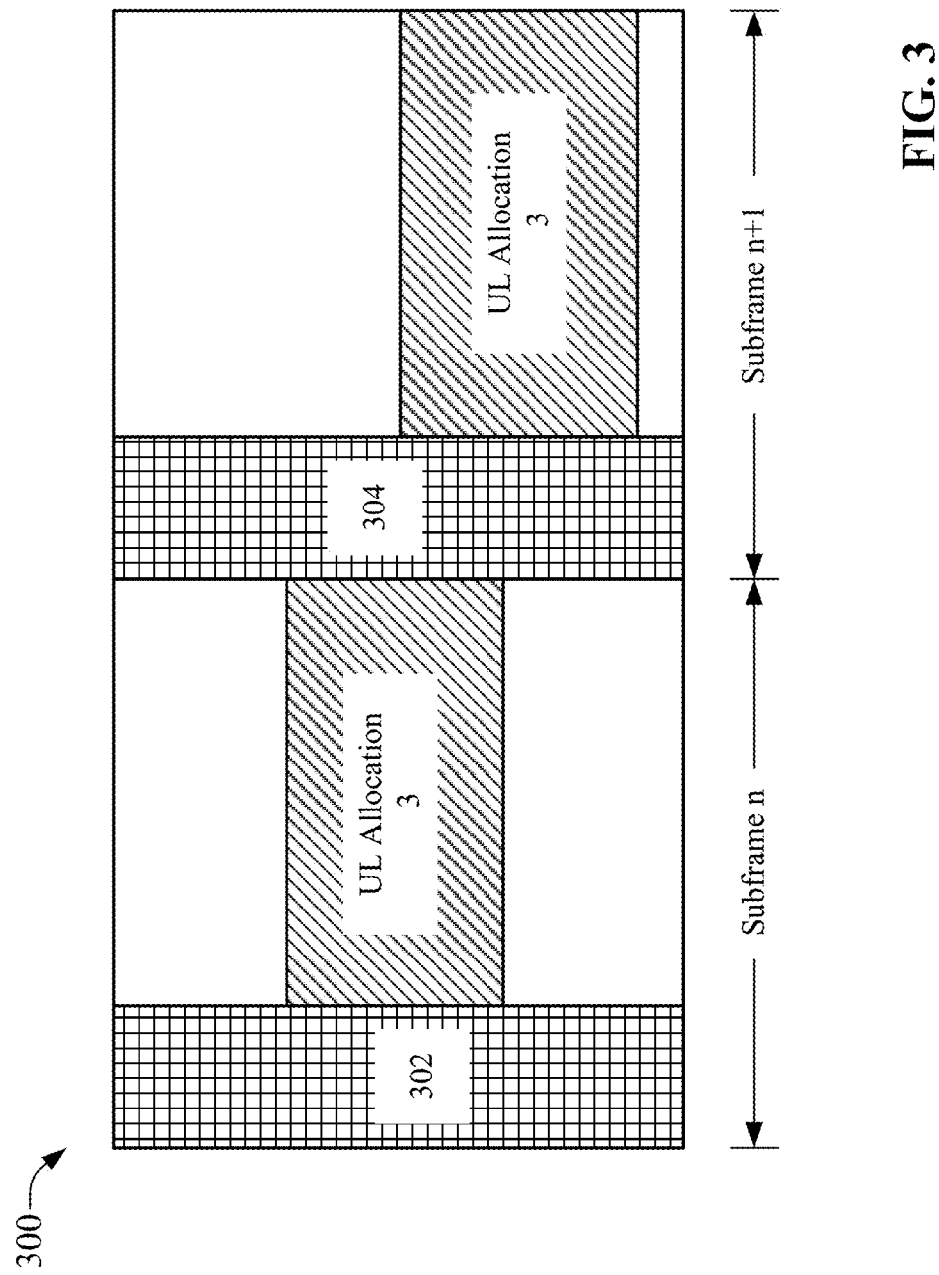

With reference to FIGS. 2 and 3, a subframe structure for supporting dynamic TDD is depicted. In FIGS. 2 and 3, all UE devices that are in connected mode initially listen for scheduling information (202, 204, 302 and 304) transmitted by the serving base station device in each subframe. In the context of FIG. 2 the scheduling information 202 and 204 can have been transmitted by a first base station device. Similarly, in regard to FIG. 3 the scheduling information 302 and 304 can have been transmitted by a second base station device. For purpose of exposition, it is assumed that the scheduling information only exists in some preserved/defined time/frequency resource in a subframe, this assumption is in general reasonable and is true in most existing systems such as LTE-A and WiMAX. In FIGS. 2 and 3, it can be seen that the scheduling information generally appears in the first OFDM symbols of a particular subframe.

A UE device can switch from a listening mode (e.g. a first mode) to a transmission mode (e.g., a second mode) upon receiving an UL allocation from received scheduling information. An UL allocation can include a subframe and a set of resource blocks (RB) for the UE device to employ to transmit UL traffic as well as other necessary parameters, such as modulation, coding, and MIMO configurations to be used during transmission of UL traffic. When a UE device transmits in a subframe, it can skip the resource allocated for scheduling information. In FIG. 2 UL Allocation 1 in subframe n+1, and in FIG. 3 UL Allocation 3 in subframe n and UL Allocation 3 in subframe n+1, can represent resources used by an UL UE device to transmit UL traffic. It will be observed that the UL UE device does not transmit in the first OFDM symbols in a subframe since the first OFDM symbols are preserved for scheduling information. Thus, skipping the scheduling information respectively illustrated in FIGS. 2 and 3 as 202, 204, 302, and 304 can have the following advantages: (i) when a preserved resource is a time resource (e.g., OFDM symbols), the base station device can still transmit scheduling information to other UE devices in the subframe while a transmitting UE device is transmitting UL data; (ii) neighboring base station devices can schedule DL traffic in a same subframe. UL UE devices can skip the preserved resource to avoid UL transmissions interfering with DL UE devices that are receiving scheduling information from neighboring base station devices, and also avoid the degradation of the reception of DL traffic in the same subframe; and (iii) should the UL UE device be a low-cost device, it may need some transition time in order to switch from DL mode (listen mode) to UL mode (transmission mode), in which case, the preserved resource can also be used as a DL/UL transition interval for the UL UE device. Once a UE device has finished its UL transmission it can switch to a listening mode and continues listening for scheduling information.

In order to mitigate interference due to sample level misalignment in UL transmissions, as described above, when an UE device that is scheduled for UL transmission in a given subframe, such as UE device can still introduce considerable interference to DL allocations (including DL traffic and scheduling information) of the other UE devices even when the DL allocations of other UE devices are scheduled in a different RB or OFDM symbols.

Conventionally, a guard interval is used to avoid DL/UL interference and should be at least one OFDM symbol. This guard interval introduces extra degree of redundancy. To circumvent this potential issue, UL transmissions of UE devices can be delayed for a given/defined time interval $\delta$ at the units of samples, where $\delta$ can be a predefined value or indicated by the system (e.g., conveyed by controlling base station devices). The rationale behind feature is that if the UL transmission is different from the DL reception within an appropriate interval $[-\delta\ \delta]$, the DFT window at the DL UE device can always be in the interval of a single OFDM symbol from UL UE device, and thus it can receive the complete information of the UL OFDM symbol. As a result, because the orthogonality of OFDM symbols can be preserved, the interference from UL symbol at other subcarriers (or ICI) can be mitigated after the DFT procedure.

The foregoing can be verified under the following assumptions: (a) the sample-level time misalignment (e.g., the time difference of the OFDM symbol boundary seen by different base station devices or UE devices) among devices is bounded in the interval $[-\delta\ \delta]$; (b) the propagation delay between two devices is represented as $\epsilon$; and (c) the CP duration of the OFDMA system is denoted as $T_{CP}$. Moreover, it can be assumed that the following inequality is satisfied $2\delta+\epsilon \leq T_{CP}$.

Thus, in the case of a receiving device R1 (e.g., a UE device or a base station device), which receives an OFDM symbol transmitted from a transmitting device T1 (e.g., a UE device which transmits with a delay $\delta$), it can be assumed that the OFDM symbol boundary seen by the receiving device R1 starts at time 0, and thus the DFT window of the receiving R1 is in the range $[T_{CP}\ T_{CP}+T_d]$, where $T_d$ is the duration of an OFDM symbol excluding the duration of CP. Accordingly, there are two possible cases depending on the start time $\tau$ of the OFDM symbol boundary at the transmitting device T1: case one is where the boundary of the transmitting device T1's OFDM symbol being earlier than the boundary of the receiving device R1's reception ($-\delta \leq \tau \leq 0$); the second case is where the boundary of the transmitting device T1's OFDM symbol being later than the boundary of the receiving device R1's ($0 \leq \tau \leq \delta$).

In the first case, where $-\delta \leq \tau \leq 0$, since the transmitting device T1 postpones its transmission with a delay $\delta$, the transmitting device T1's OFDM symbol will arrive at the receiving device R1 at time $\tau+\delta+\epsilon$, which is within the range $[\epsilon\ \delta+\epsilon]$, and it ends within the range $[\epsilon+T_{CP}+T_d\ \delta+\epsilon+T_{CP}+T_d]$. As a result, the DFT window at the receiving device R1 can always be in the interval of a single OFDM symbol from the transmitting device T1.

In the second case, where $(0 \leq \tau \leq \delta)$, since the transmitting device T1 postpones its transmission with a delay $\delta$, the OFDM symbol transmitted by the transmitting device T1 will arrive at the receiving device R1 at time $\tau+\delta+\epsilon$, which is within the range $[\delta+\epsilon\ T_{CP}]$, and it ends within the range $[\delta+\epsilon+T_{CP}+T_d\ 2T_{CP}+T_d]$. Again, the DFT window at the receiving device R1 can always be in the interval of a single OFDM symbol from the transmitting device T1.

Accordingly, in both the first and second cases, the DFT window at the receiving device R1 can always be in the interval of a single OFDM symbol from transmitting device T1, and thus it guarantees the DFT window of all the receivers (e.g., both base station devices and UE devices) in the system will in an OFDM symbol transmitted by all the UE devices. As a result, reception at all the receivers will not be interfered with by any of the UL UE devices after the DFT process, should UL transmissions and DL transmissions be allocated in different RBs. Thus, it can be concluded that, when $\delta$ satisfies $2\delta+\epsilon \leq T_{CP}$, the disclosed delayed transmission method avoids the sample-level time misalignment issue outlined above.

In order to mitigate the near-far issue through use of coordinated scheduling, when a base station device schedules DL traffic in a subframe and a neighboring base station device schedules UL traffic in the same subframe, coordinated scheduling can be adopted to ensure that different RBs for DL and UL resource are respectively allocated, as illustrated in FIGS. 2 and 3. As a result, disparate base station devices can be in an UL mode or a DL mode at the same subframe without causing UL/DL interference.

Nevertheless, in extreme cases, separating UL/DL resources might not resolve the near-far effect entirely. For example, when the receiving power from other UE devices are much larger than the power from a serving base station device, and the DL signal from the serving base station device would be destroyed (e.g. when a first UE device in a first small cell controlled by a first base station device interferes with a second UE device in a second small cell controlled by a second base station device). This can be due to hardware limitations. For example, quantization errors can occur at a auto-gain controller (AGC), and/or the receive can have become saturated and lost linearity, because it is out of dynamic range (operation range). However, in the small cell context, the UL power and interference from other UE devices can be limited, and thus separating UL/DL resource can still resolve the near-far effect.

A further utilization enhancement can be provided by coordinating more than one base station device, wherein when there are UE devices with DL or UL traffic demands in the same subframe, base station devices in neighboring cells can be configured to be in different transmission directions (e.g., DL or UL) and serve the DL and UL UE devices at the same time. For example, the DL/UL modes of the base station devices can be optimally coordinated as a further utilization enhancement.

Figure 5:
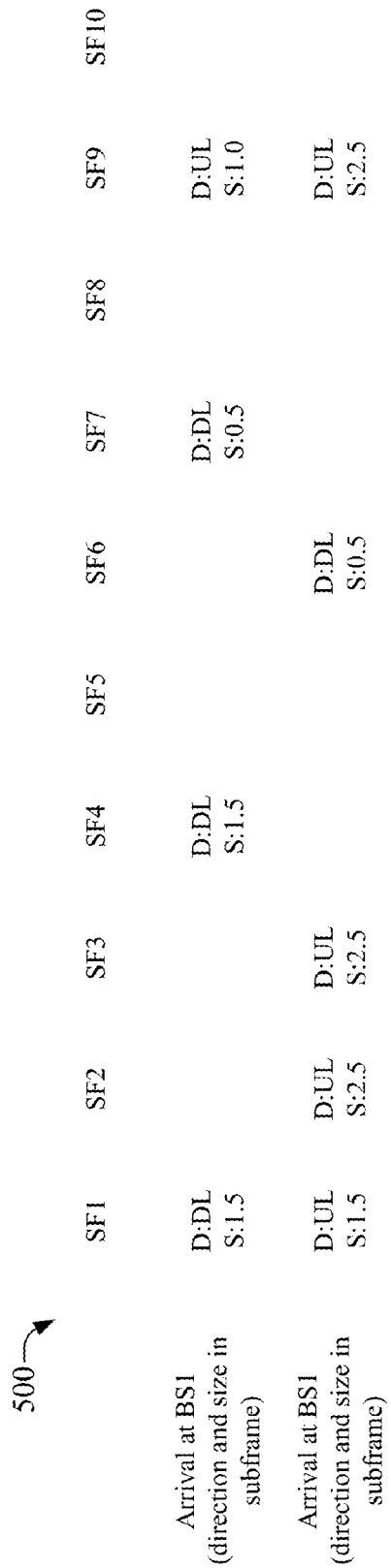
FIG. 5 illustrates a traffic arrival pattern of subframes at respective base station devices, in accordance with aspects of the subject disclosure.

FIGS. 4-7 provide an illustrative example of the foregoing dynamic TDD mechanism, where as illustrated in FIG. 4 two neighboring base station devices (e.g., base station 1 (402) and base station 2 (408)) are deployed and serve UE devices (404 and 406) in their respective coverage areas. As depicted in FIG. 5, a first subframe (abbreviated as SF1) starts off a busy period where new traffic arrives in the first ten subframes (i.e. SF1-SF10). FIG. 5 shows traffic arriving at each respective base station device (e.g., base station 1 (402) and base station 2 (408)) in the first ten subframes, where each arriving traffic has two characteristic attributes.

In FIG. 5 'D' means direction (e.g., DL or UL), and 'S' means size in the subframes. For purposes of this example, it is assumed a three processing latency is needed between a UE device receiving an UL allocation from the scheduling information and transmitting the UL traffic.

Figure 6:
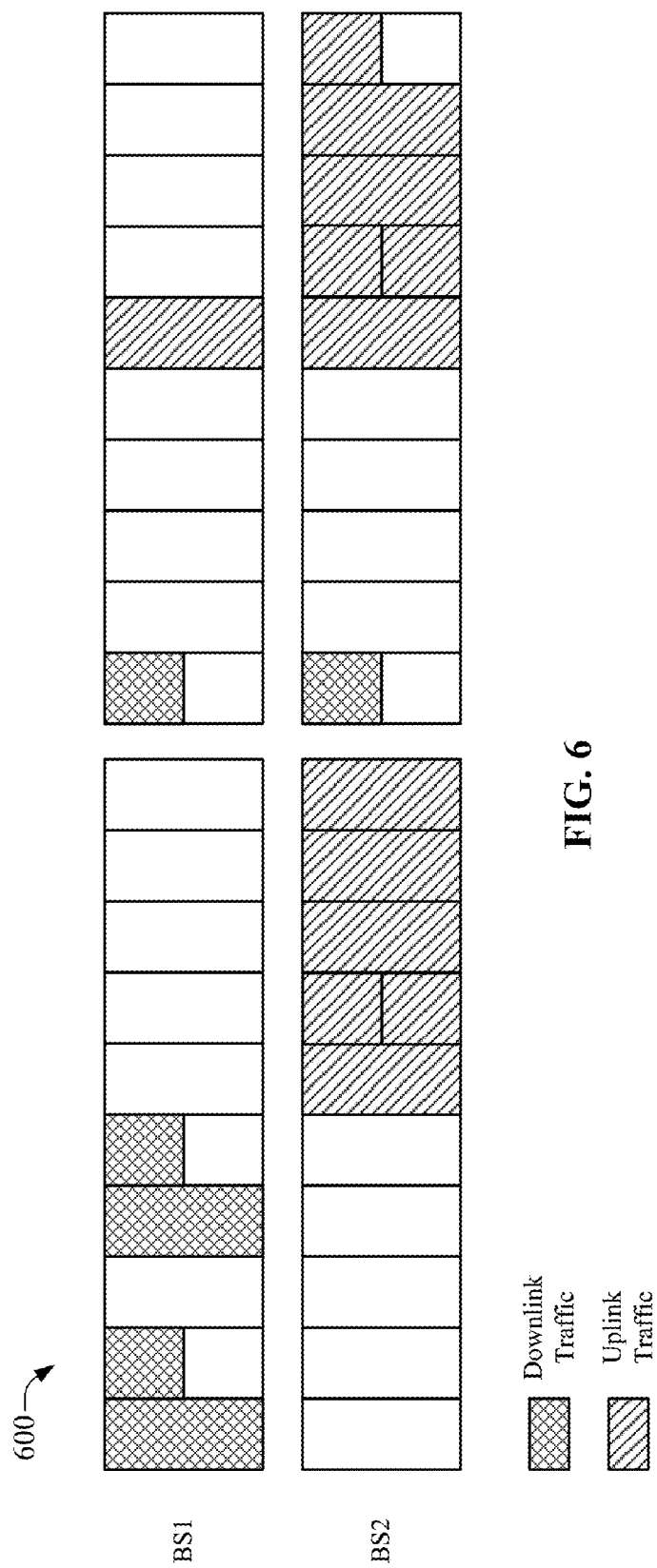
FIG. 6 illustrates a resource scheduling pattern typical in convention long term evolution (LTE) TDD system, in accordance with aspects of the subject disclosure.

FIG. 6 depicts a resource scheduling pattern of conventional LTE TDD systems with 1:1 DL/UL ratio, where a radio frame consists ten consecutive subframes in which the first five subframe are for DL transmission and the remainder are for UL transmission, respectively. In FIG. 6, it can be seen that the total number of subframes used to transmit the arrival traffic in the first ten subframes (SF1-SF10) is 20 subframe. Moreover, the number of idle resource subframes where neither the first base station 402 nor the second base station 408 transmit or receive data is 7 subframes.

Figure 7:
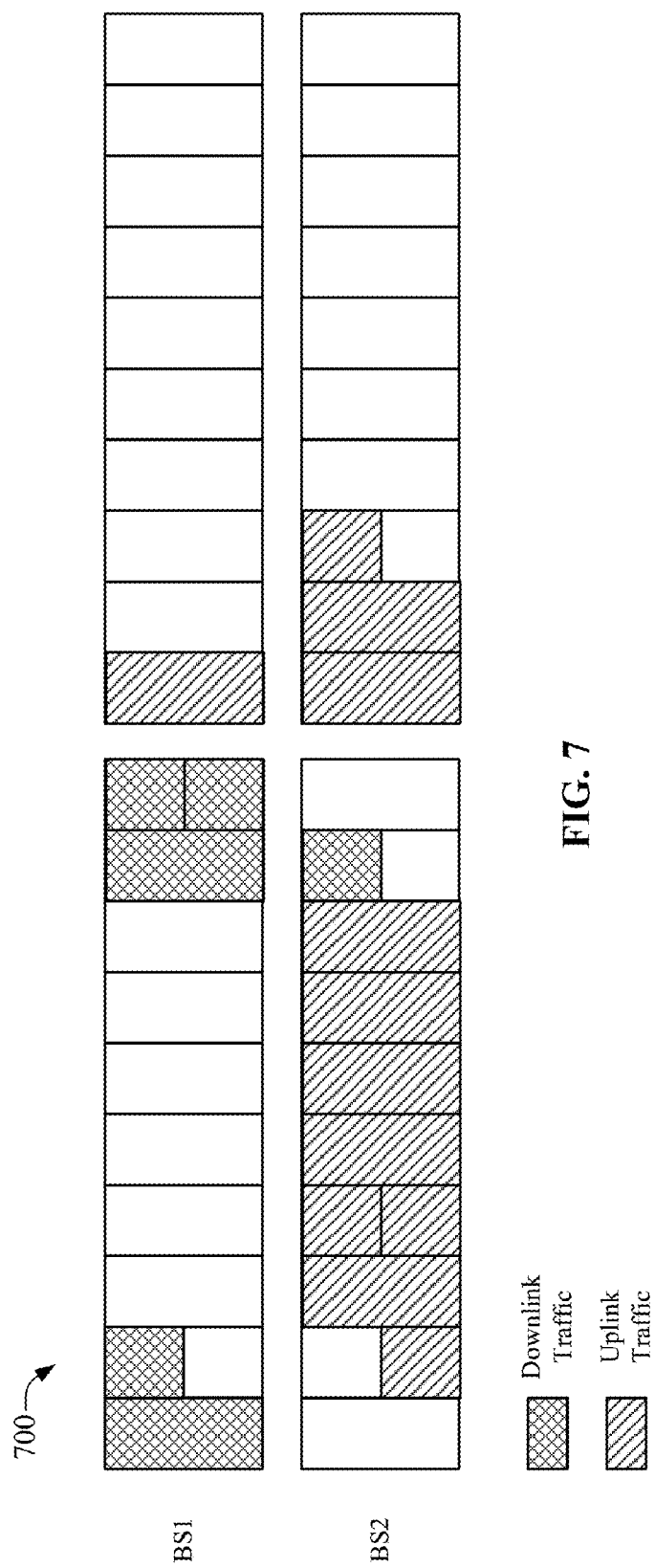
FIG. 7 illustrates a resource scheduling pattern typical through use of a dynamic TDD mechanism, in accordance with aspects of the subject disclosure.

As illustrated in FIG. 7 on the other hand, the resource scheduling pattern of a dynamic TDD mechanism as described herein uses 13 subframes to transmit all the traffic that arrives in the first 10 subframes, which is much smaller than the number of subframes used in conventional TDD systems. Additionally, there are no idle resources in the disclosed dynamic TDD mechanism, which is a much more efficient resource utilization. Thus, the disclosed dynamic TDD mechanism provides improvements in the context of higher resource utilization by avoiding the occurrence of idle resources; and faster scheduling cycling since each subframe can be used to convey the scheduling information. For example, in conventional TDD systems, when an UL traffic arrives in a UL subframe, it typically cannot be transmitted until the next radio frame since scheduling information cannot be conveyed, which degrades overall system performance.

Figure 8:
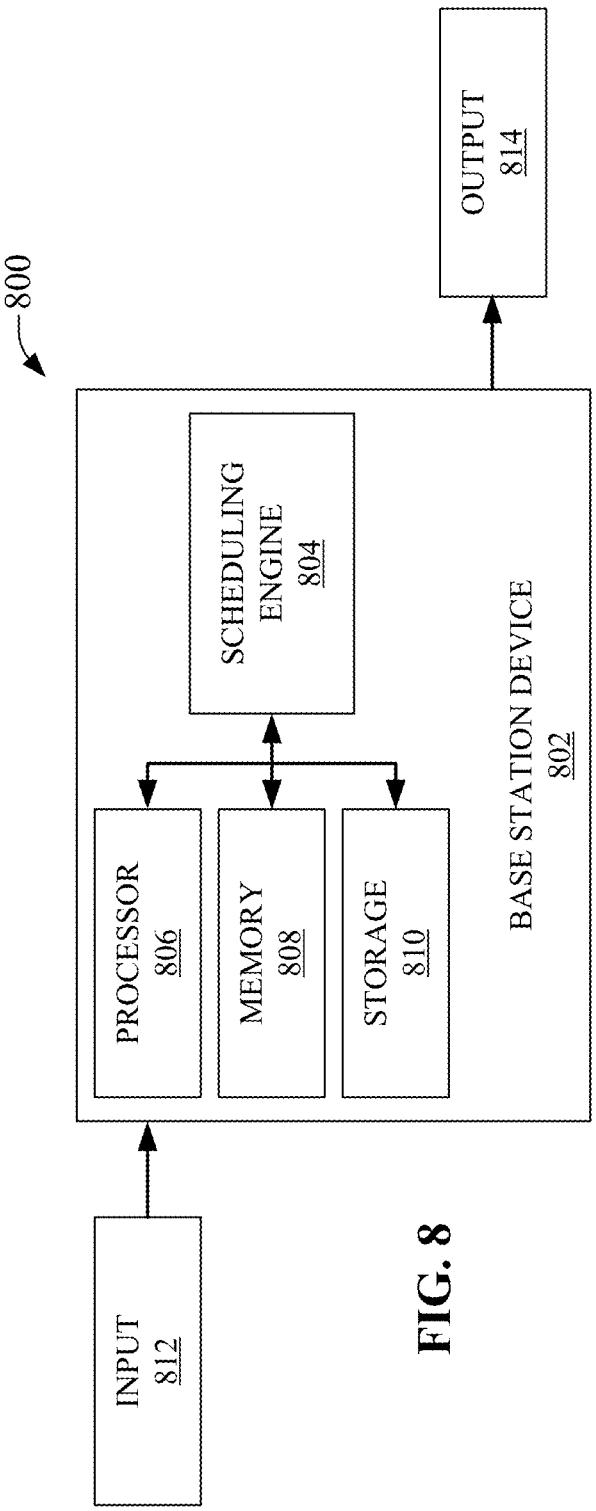
FIG. 8 is an illustration of a system for providing a dynamic TDD mechanism for utilization in a small cellular network, in accordance with aspects of the subject disclosure.

FIG. 8 illustrates a system 800 providing a dynamic TDD mechanism for utilization in a small cellular network, in accordance with an embodiment. As illustrated, system 800 can comprise base station device 802 that, in addition to the depicted components/engines/devices, can additionally comprise, though not illustrated, multiple antenna groups, transmitter chains and/or receiver chains, which respectively can in turn comprise a plurality of components/devices associated with signal transmission and signal reception (e.g., processors, modulators, multiplexers, demodulators, demultiplexers, antennas, etc.), as will be appreciated by those skilled in the art.

Base station device 802 can communicate with one or more user equipment (UE) devices, mobile device or access terminal; it is to be appreciated that base station device 802 can communicate with substantially any number of UE devices or access terminals, wherein such UE devices, mobile devices or access terminals can be, for example, cell phones, smart phones, laptops, handheld communication devices, handheld computing devices, satellite radios, global positioning systems, personal digital assistants (PDAs), and/or any other suitable device for communicating over a wireless communication system.

Base station device 802 can include scheduling component/engine 804 that can be coupled to processor 806, memory 808, and storage 810. Scheduling engine 804 can be in communication with processor 806 for facilitating operation of computer or machine executable instructions and/or components by scheduling engine 804, memory 808 for storing data and/or the computer or machine executable instructions and/or components, and storage 810 for providing longer term storage of data and/or machine and/or computer executable instructions. Additionally, base station device 802 can also receive input 812 for use, manipulation, and/or transformation by scheduling engine 804 to produce one or more useful, concrete, and tangible result and/or transform one or more articles to different states or things. Further, base station device 802 can also generate and output the useful, concrete, and tangible result and/or the transformed one or more articles produced by scheduling engine 804 and output as output 814.

As will be observed from the foregoing, base station device 802 can be any type of mechanism, machine, device, facility, and/or instrument that includes a processor and/or is capable of effective and/or operative communication with a network topology. Mechanisms, machines, devices, facilities, and/or instruments that can comprise base station device 802 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Scheduling engine 804 can transmit time division duplex scheduling data comprising scheduling information data, wherein the scheduling information data comprises either UL allocation data that can be used during an UL transmission or DL allocation data that can be used during a DL transmission, wherein the UL transmission and the DL transmission can be scheduled dynamically. Upon receiving such scheduling information data, a UE device can, depending the type of allocation data received (e.g., UL allocation data or DL allocation data) can switch from a first mode (e.g., a listening mode) to a second mode (e.g., a transmitting mode) as a function of the received allocation data. The UE device can, depending on the mode that it is in, thereafter transmit/receive transmission data in a subframe of a frame by skipping a resource allocated for the scheduling information data. Typically, the allocation data can comprise subframe data that can be related to the subframe used for transmitting the transmission data. Where the allocation data is uplink allocation data the uplink allocation data can comprise resource block data comprising a set of resource blocks used for transmitting the transmission data, wherein the set of resource blocks is used to transmit modulation data comprising a modulation parameter. The set of resource blocks can also be used to transmit coding data comprising a coding used during the transmitting. Further, the set of resource blocks can also be used to transmit multiple input multiple output (MIMO) configuration data used during the transmitting.

A receiving UE device, in response to the scheduling information data being determined to comprise downlink allocation data and uplink allocation data, or a component associated with the UE device, can allocate a first subset of the set of the resource blocks for uplink transmissions of the transmission data in the subframe and allocate a second subset of the set of the resource blocks for downlink transmissions of the transmission data in the subframe. Further, the receiving UE device in response to completion of the transmission can switch from the second mode to the first mode.

Figure 9:
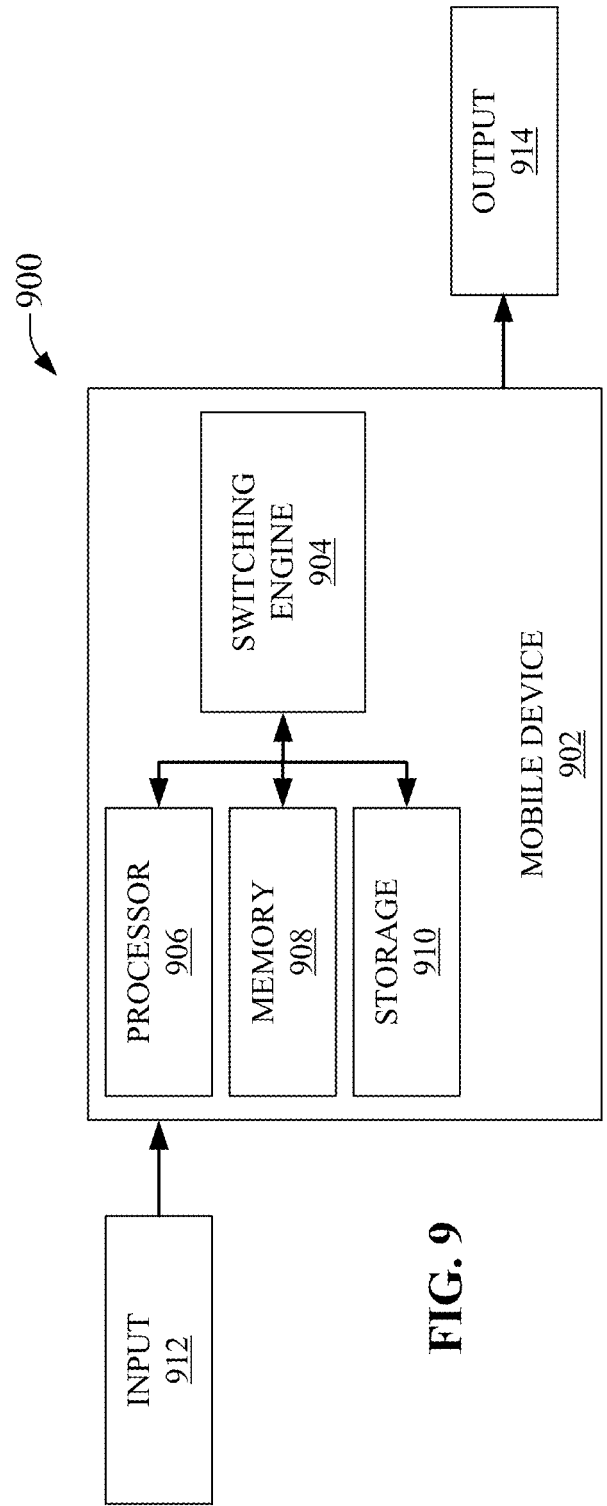
FIG. 9 is an illustration of a system for providing a dynamic TDD mechanism for utilization in a small cellular network, in accordance with aspects of the subject disclosure.

FIG. 9 provides further illustration of a system 900 providing a dynamic TDD mechanism for utilization in a small cellular network, in accordance with an additional embodiment. System 900 can comprise mobile device 902 (e.g., UE device) that, in addition to the depicted components/engines/devices can also comprise, though not illustrated, multiple antennas, transmitter and/or receiver chains, wherein the transmitter chains and/or receiver chains can in turn comprise a plurality of components/devices associated with signal transmission and/or signal reception (e.g., processors, modulators, multiplexers, demodulators, demultiplexers, antennas, and the like), as will be appreciated by those skilled in the art.

As will be appreciated by those skilled in the art, mobile device 902 can be any type of mechanism, machine, device, facility, and/or instrument that includes a processor and/or is capable of effective and/or operative communication with a network topology. Illustrative mechanisms, machines, devices, facilities, and/or instruments of execution that can comprise mobile device 902 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Mobile device 902 can include switching engine 904 that can be coupled to processor 906, memory 908, and storage 910. Switching engine 904 can be in communication with processor 906 for facilitating operation of computer or machine executable instructions and/or components by switching engine 904, memory 908 for storing data and/or the computer or machine executable instructions and/or components, and storage 910 for providing longer term storage of data and/or machine and/or computer executable instructions. Additionally, mobile device 902 can also receive input 912 for use, manipulation, and/or transformation by switching engine 904 to produce one or more useful, concrete, and tangible result and/or transform one or more articles to different states or things. Further, mobile device 902 can also generate and output the useful, concrete, and tangible results and/or the transformed one or more articles produced by switching engine 904 and output as output 914.

Switching engine 904, in accordance with an embodiment, can receive time division duplex scheduling data comprising scheduling information data, wherein the scheduling information data comprises uplink allocation data to be transmitted during uplink transmissions or downlink allocation data to be transmitted during downlink transmissions, wherein the time division duplex scheduling data is received from disparate base station devices (e.g., a first base station device, a second base station device, a third base station device, etc.) as a function of coordination between the disparate base station devices, and wherein the uplink transmissions and the downlink transmissions are scheduled dynamically, switch from a first mode (e.g., a listening mode) to a second mode (e.g., a transmitting mode) as a function of the uplink allocation data; and transmit transmission data in a subframe of a frame by skipping a resource allocated for the scheduling information data. The uplink allocation data can comprise: subframe data related to the subframe used for transmitting the transmission data; and resource block data comprising a set of resource blocks used for transmitting the transmission data. The set of resource blocks can be used to: transmit modulation data comprising a modulation parameter; transmit coding data comprising a coding used during the transmitting; and transmit multiple input multiple output (MIMO) configuration data used during the transmitting.

Switching engine 904, in accordance with a further aspect, in response to the scheduling information data being determined to comprise downlink allocation data and uplink allocation data, can allocate a first subset of the set of the resource blocks for uplink transmissions of the transmission data in the subframe and allocate a second subset of the set of the resource blocks for downlink transmissions of the transmission data in the subframe.

Switching engine 904, in response to completion of the transmitting, can switch from a second mode to a first mode, and delay the transmissions for defined time intervals, wherein the defined time interval is supplied in the scheduling data, is a predefined value, and/or is a cyclic prefix length of an orthogonal frequency division multiplexing (OFDM) symbol.

Figure 10:
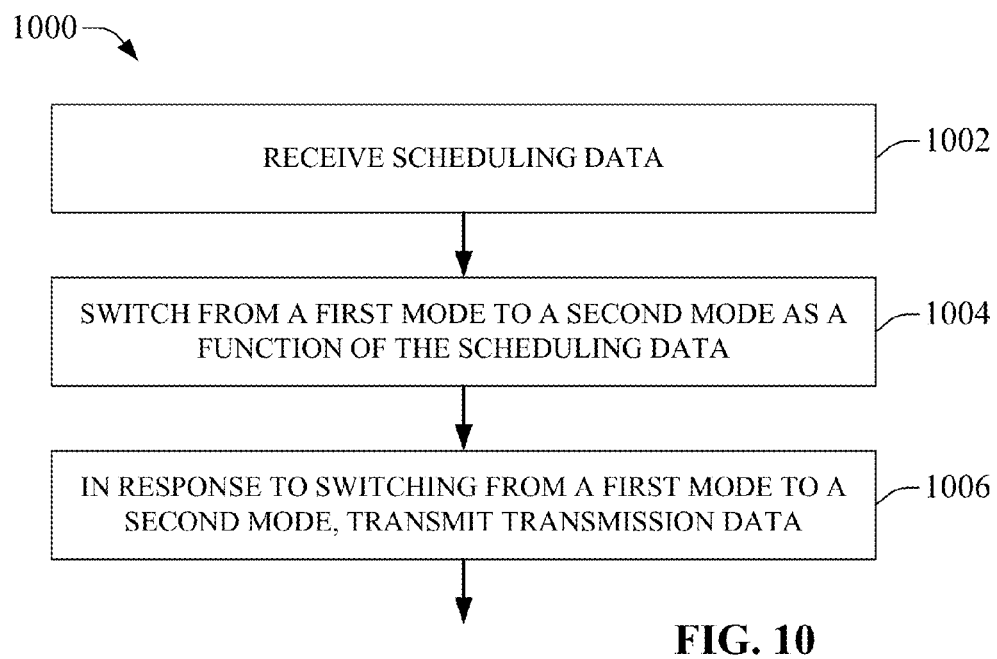
FIG. 10 illustrates a flow chart or method for providing a dynamic TDD mechanism for utilization in a small cellular network, in accordance with aspects of the subject disclosure.

In view of the example system(s) described above, example method(s) that can be implemented in accordance with the disclosed subject matter can be better appreciated with reference to the flowchart in FIG. 10. For purposes of simplicity of explanation, example methods disclosed herein are presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 10 depicts an illustrative method 1000 for utilizing a dynamic TDD mechanism in a small cellular network, in accordance with an embodiment. Generally, the methodology outlined in FIG. 10 can be facilitated or effectuated by a UE device, such as a mobile device or access point. Method 1000 can commence at 1002 whereupon a UE device can receive scheduling data that can comprise scheduling information data. Typically the scheduling information data can include uplink allocation data or downlink allocation data, though for purposes of this example and at this particular stage of the process (e.g., act 1002), the scheduling information data can include uplink allocation. In response to receiving the scheduling data at 1002, the UE device, at act 1004, can switch from a first mode (e.g., a listening mode) to a second mode (e.g., a transmitting mode) as a function of the received uplink allocation data. At 1006, in response to switching from the first mode to the second mode, the UE device can transmit transmission data in a subframe of a frame by skipping a resource allocated for the scheduling information data.

Figure 11:
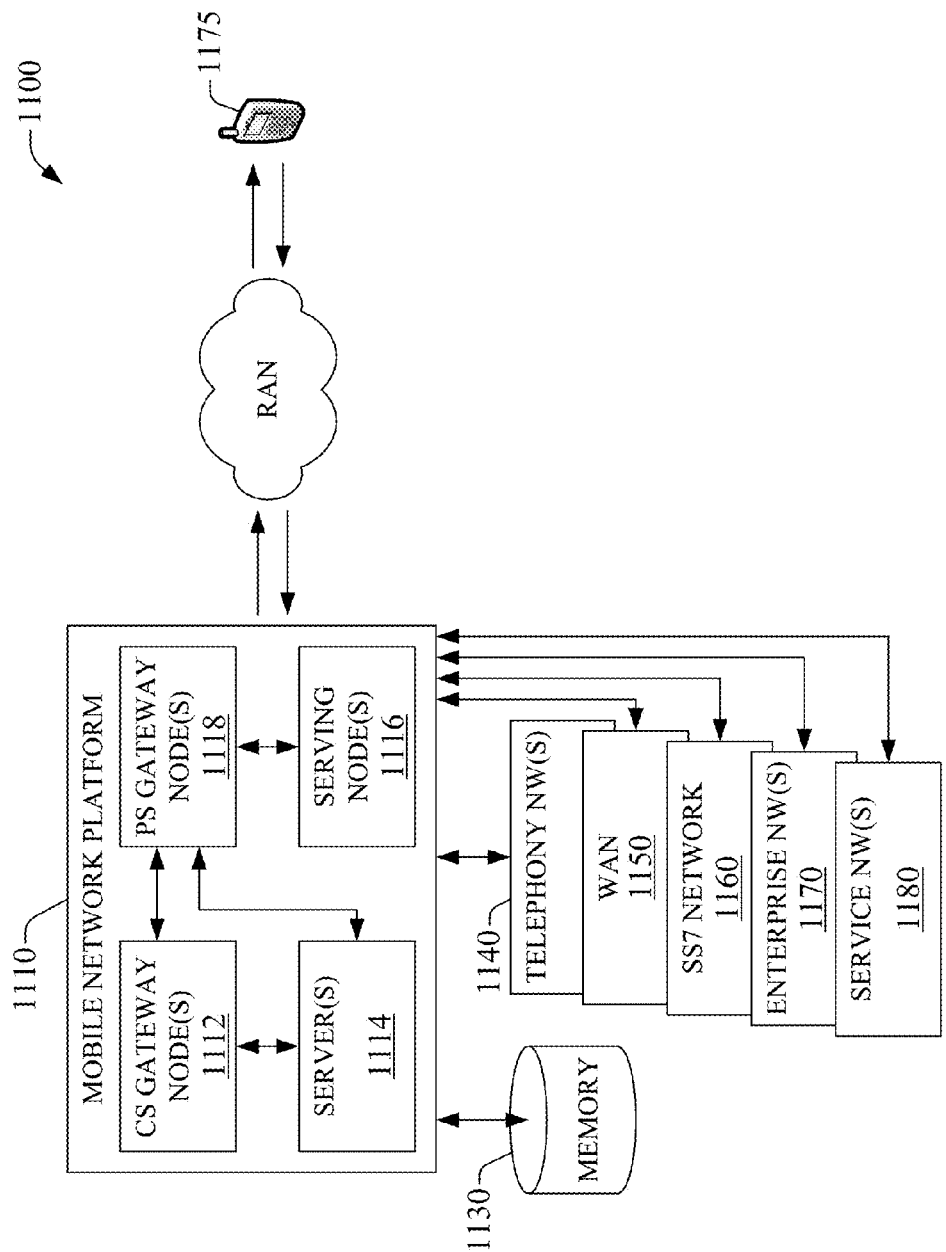
FIG. 11 is a block diagram of an example embodiment of a mobile network platform to implement and exploit various features or aspects of the subject disclosure.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

Figure 12:
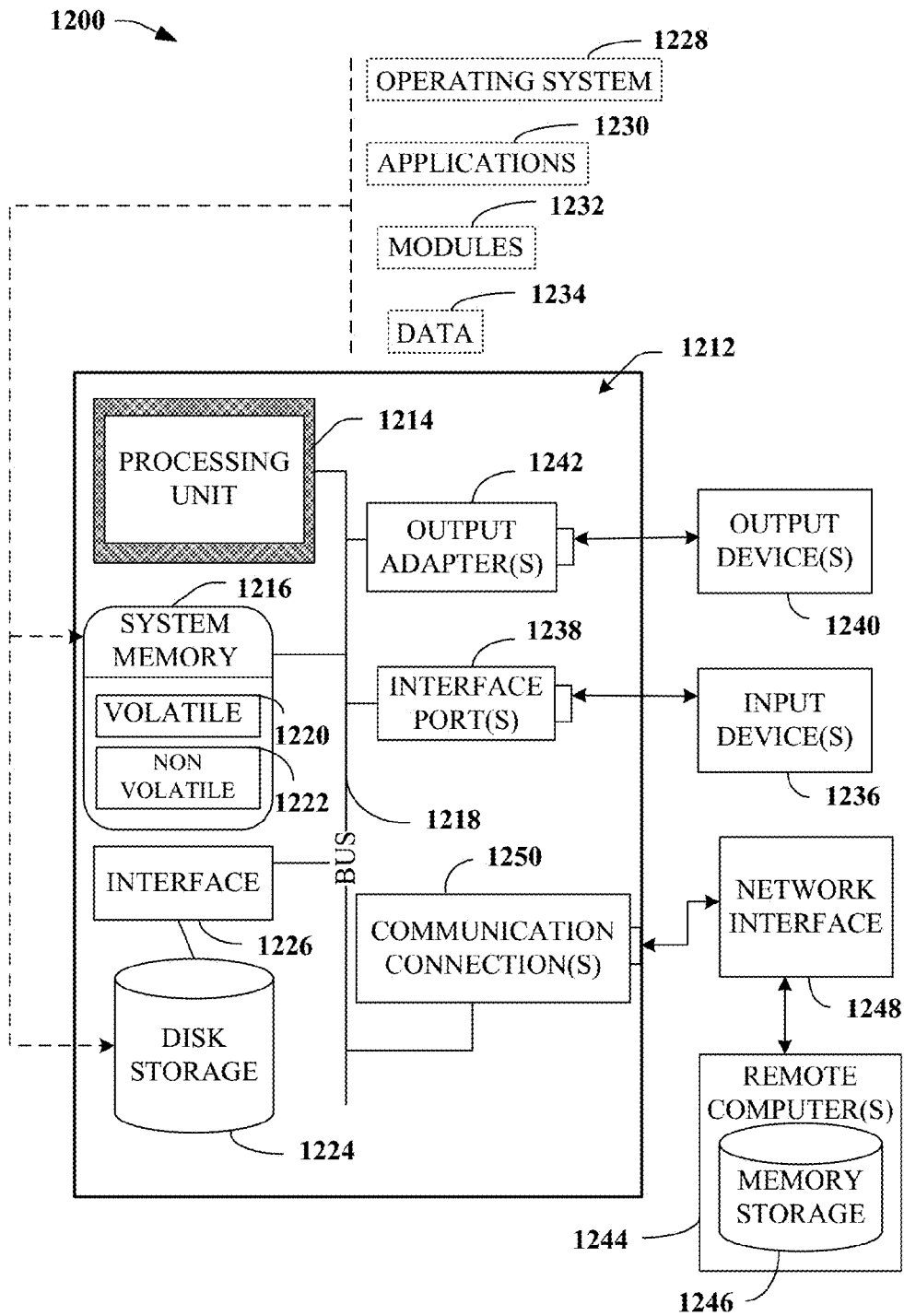
FIG. 12 illustrates a block diagram of a computing system operable to execute the disclosed systems and methods in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be, for example, part of the hardware of system 120, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory"

herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, mobile device 122 and/or portable device 124 can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A mobile device, comprising:
a processor; and
a memory that stores executable instructions that, when executed by the processor, facilitates performance of operations, comprising:
receiving time division duplex scheduling data comprising scheduling information data, wherein the scheduling information data comprises uplink allocation data to be transmitted during an uplink transmission or downlink allocation data to be transmitted during a downlink transmission, wherein the time division duplex scheduling data is received from a first base station device or a second base station device as a function of a coordination between the first base station device and the second base station device, and wherein the uplink transmission and the downlink transmission are scheduled dynamically;
switching from a first mode to a second mode as a function of the uplink allocation data; and
transmitting transmission data in a subframe of a frame by skipping a first orthogonal frequency division multiplexing (OFDM) symbol that is a resource of the subframe allocated for the scheduling information data, such that the scheduling information data is received by the mobile device in the first OFDM symbol of the subframe and the transmission data is transmitted from the mobile device after the first OFDM symbol of the subframe in an uplink transmission within the same subframe.

2. The mobile device of claim 1, wherein the first mode is a listening mode and the second mode is a transmitting mode, and wherein the resource of the subframe allocated for receiving the scheduling information data allows time for the mobile device to switch from the first mode to the second mode.

3. The mobile device of claim 1, wherein the uplink allocation data comprises subframe data related to the subframe used for transmitting the transmission data.

4. The mobile device of claim 1, wherein the uplink allocation data comprises resource block data comprising a set of resource blocks used for transmitting the transmission data.

5. The mobile device of claim 4, wherein the set of resource blocks is used to transmit modulation data comprising a modulation parameter.

6. The mobile device of claim 4, wherein the set of resource blocks is used to transmit coding data comprising a coding used during the transmitting.

7. The mobile device of claim 4, wherein the set of resource blocks is used to transmit multiple input multiple output (MIMO) configuration data used during the transmitting.

8. The mobile device of claim 4, wherein the operations further comprise,
in response to the scheduling information data being determined to comprise downlink allocation data and uplink allocation data,
allocating a first subset of the set of the resource blocks for uplink transmissions of the transmission data in the subframe and
allocating a second subset of the set of the resource blocks for downlink transmissions of the transmission data in the subframe.

9. The mobile device of claim 1, wherein the operations further comprise in response to completion of the transmitting, switching from the second mode to the first mode.

10. The mobile device of claim 1, wherein the operations further comprise delaying the transmitting for a defined time interval.

11. The mobile device of claim 10, wherein the defined time interval is supplied in the scheduling data.

12. The mobile device of claim 10, wherein the defined time interval is a predefined value.

13. The mobile device of claim 10, wherein the defined time interval is a cyclic prefix length of an orthogonal frequency division multiplexing (OFDM) symbol.

14. A method, comprising:
receiving, by a mobile device comprising a processor, scheduling data comprising uplink allocation data;
switching from a first mode to a second mode based on the uplink allocation data; and
initiating a transmission of transmission data in a subframe of a communication frame by skipping a first orthogonal frequency division multiplexing (OFDM) symbol that is a resource of the subframe allocated for the scheduling data, such that the scheduling data is received by the mobile device in the first OFDM symbol of the subframe and the transmission data is transmitted from the mobile device after the first OFDM symbol of the subframe in an uplink transmission within the same subframe.

15. The method of claim 14, further comprising transmitting the transmission data in the subframe based on subframe data that comprises the uplink allocation data.

16. The method of claim 14, further comprising: transmitting the transmission data as a function of resource block data that comprises a set of resource blocks, wherein the set of resource blocks comprises the uplink allocation data.

17. A computer readable storage device comprising executable instructions that, in response to execution, cause a system comprising a processor to perform operations, comprising:
receiving scheduling data comprising scheduling information data, wherein the scheduling information data comprises uplink allocation data;
based on the uplink allocation data, initiating a switch from a listening mode to a transmitting mode; and
as a function of the switch, transmitting data in a subframe of a communication frame by skipping a first orthogonal frequency division multiplexing (OFDM) symbol that is a resource of the subframe allocated for the scheduling data, such that the scheduling data is received in the first OFDM symbol of the subframe and the data is transmitted after the first OFDM symbol of the subframe in an uplink transmission within the same subframe.

18. The computer readable storage device of claim 17, wherein the operations further comprise: transmitting the data in the subframe based on subframe data that comprises the uplink allocation data.

19. The computer readable storage device of claim 17, wherein the operations further comprise: transmitting the data as a function of resource block data that comprises a set of resource blocks, wherein the set of resource blocks comprises the uplink allocation data.

\* \* \* \* \*